US012646220B2

(12) United States Patent
Nguyen Canh et al.

(10) Patent No.: US 12,646,220 B2
(45) Date of Patent: Jun. 2, 2026

(54) SYSTEMS AND METHODS FOR REFLECTION SYMMETRY-BASED MESH CODING

(71) Applicant: Tencent America LLC, Palo Alto, CA (US)

(72) Inventors: Thuong Nguyen Canh, Palo Alto, CA (US); Xiaozhong Xu, Palo Alto, CA (US); Xiang Zhang, Palo Alto, CA (US); Chao Huang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 376 days.

(21) Appl. No.: 18/208,111

(22) Filed: Jun. 9, 2023

(65) Prior Publication Data

US 2024/0029316 A1     Jan. 25, 2024

Related U.S. Application Data

(60) Provisional application No. 63/389,316, filed on Jul. 14, 2022.

(51) Int. Cl.
*G06T 7/68* (2017.01)
*G06T 9/00* (2006.01)
*H04N 19/119* (2014.01)

(52) U.S. Cl.
CPC ................ *G06T 9/001* (2013.01); *G06T 7/68* (2017.01)

(58) Field of Classification Search
CPC ........... G06T 9/001; G06T 7/68; G06T 9/004; G06T 7/11; G06T 17/205; G06T 17/20; G06T 19/20; H04N 19/119
See application file for complete search history.

(56) References Cited

U.S. PATENT DOCUMENTS

2005/0131660 A1    6/2005  Yadegar et al.
2017/0177770 A1*   6/2017  Letzelter ................. G06F 30/23
(Continued)

FOREIGN PATENT DOCUMENTS

JP          H 11161800 A      6/1999
JP          2015504559 A      2/2015
WO      WO 2021/062528 A1     4/2021

OTHER PUBLICATIONS

Golovinskiy, A., Podolak, J., & Funkhouser, T. (2009). Symmetry-aware mesh processing. Lecture Notes in Computer Science, 170-188. https://doi.org/10.1007/978-3-642-03596-8_10 (Year: 2009).*
(Continued)

*Primary Examiner* — John Villecco
*Assistant Examiner* — Kyla Guan-Ping Tiao Allen
(74) *Attorney, Agent, or Firm* — Morgan, Lewis & Bockius LLP

(57)     ABSTRACT

The various implementations described herein include methods and systems for encoding video. In one aspect, a method includes receiving a mesh with polygons representing a surface of an object; detecting a first symmetric region in the mesh that includes a first symmetry line to divide the first symmetric region into a first partition and a second partition. The method includes recursively determining whether one of the first partition or the second partition includes a second symmetric region until no symmetric region is detected in both the first partition and the second partition. The method includes in response to detecting the second symmetric region within one of the first partition or the second partition: determining a second symmetry line within the second symmetric region to divide the first or the second partition into a third sub-partition and a fourth sub-partition; and compressing information of the third sub-partition, the sec-
(Continued)

400

402 ond symmetry line and the first symmetry line into a bitstream.

19 Claims, 11 Drawing Sheets

(56)                 References Cited

U.S. PATENT DOCUMENTS

| | | | |
|---|---|---|---|
| 2020/0029087 A1 | 1/2020 | Lim et al. | |
| 2020/0288150 A1* | 9/2020 | Jun | H04N 19/46 |
| 2020/0302632 A1 | 9/2020 | Oh | |
| 2022/0159284 A1* | 5/2022 | Hur | H04N 21/44218 |

OTHER PUBLICATIONS

Tencent America LLC, ISRWO, PCT/US2023/025084, Sep. 8, 2023, 31 pgs.
Tencent America LLC, Extended European Search Report, EP Patent Application No. 23840112.9, Oct. 10, 2025, 6 pgs.
Patricio Simari et al., "Folding Meshes: Hierarchical Mesh Segmentation Based on Planar Symmetry", Eurographics Symposium on Geometry Processing, 2006, 9 pgs.
Xiang Zhang et al., "Tencent's Response to the CfP of Dynamic Mesh Coding m59295", Tencent, Apr. 2022, 37 pgs.

* cited by examiner

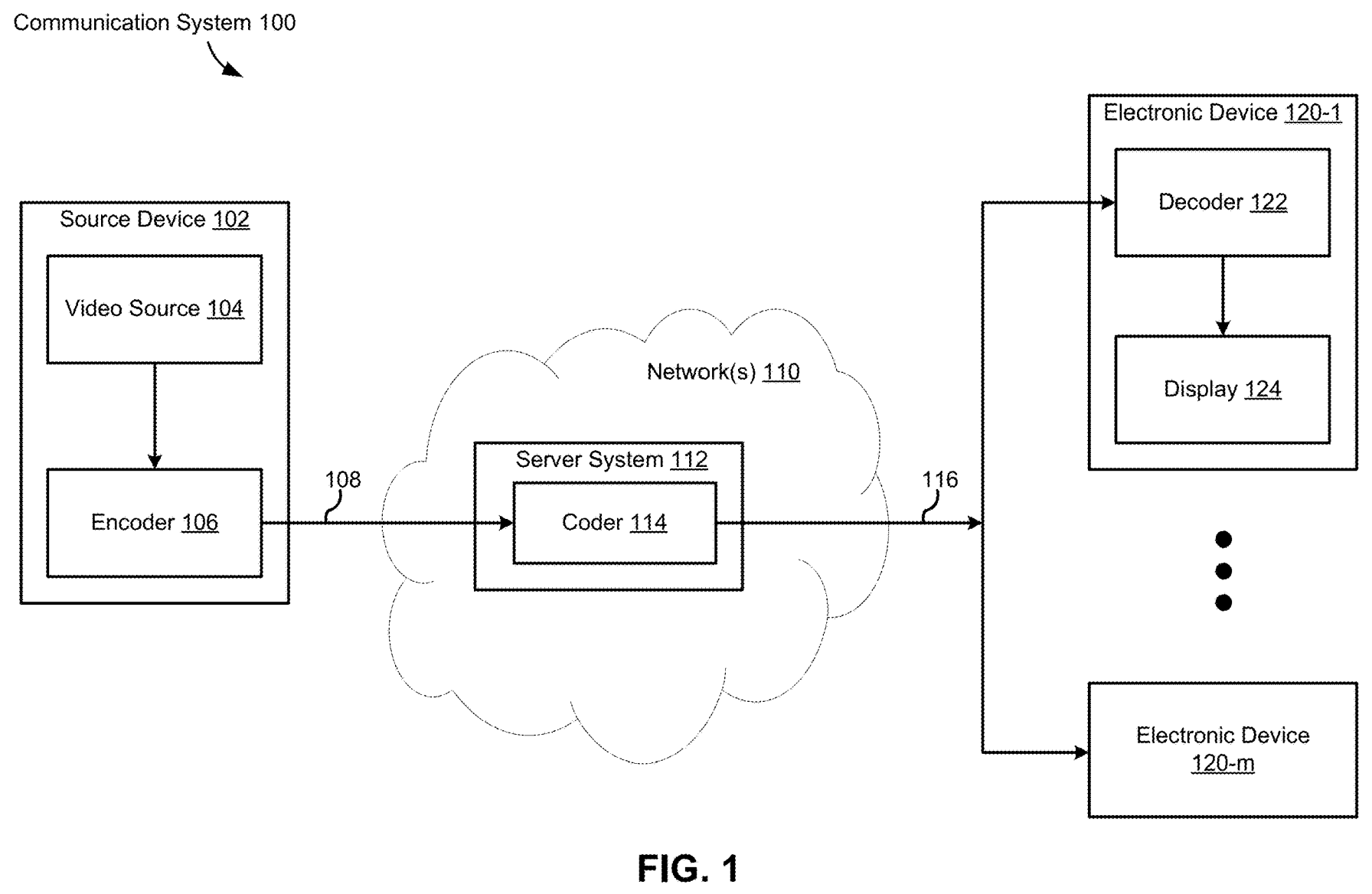

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

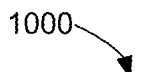

1000

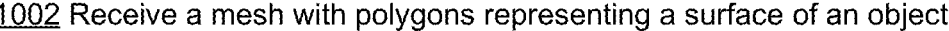

1002 Receive a mesh with polygons representing a surface of an object

1004 Detect a first symmetric region in the mesh that includes a first symmetry line to divide the first symmetric region into a first partition and a second partition 1006 Recursively determine whether one of the first partition or the second partition includes a second symmetric region until no symmetric region is detected in both the first partition and the second partition 1008 In response to detecting the second symmetric region within one of the first partition or the second partition: determining a second symmetry line within to divide the first or the second partition into a third sub-partition and a fourth sub-partition 1010 Compress information of the third sub-partition, the second symmetry line and the first symmetry line into a bitstream

FIG. 10

SYSTEMS AND METHODS FOR REFLECTION SYMMETRY-BASED MESH CODING

RELATED APPLICATIONS

This application claims priority to U.S. Provisional Patent Application No. 63/389,316, entitled "Refection Symmetry-Based Mesh Coding" filed Jul. 14, 2022, which is hereby incorporated by reference in its entirety.

TECHNICAL FIELD

The disclosed embodiments relate generally to video coding, including but not limited to systems and methods for reflection symmetry-based mesh coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/ H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/ decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes utilizing a symmetry predictor that may significantly reduce redundant information in one or both of vertex positions (x, y, z) and UV coordinates of a mesh of a 3D model. In contrast to existing mesh coding algorithms that may mainly exploit local characteristics of meshes. 3D models exhibit strong reflection symmetry properties, especially for artificial objects. In some embodiments, 3D character models are designed with default A-Pose or T-Pose that has a perfect symmetrical plane. Further, the present disclosure describes methods that are more efficient in coding than recursive symmetrical partitioning in folding meshes, which introduce more distortions with more folding and less potential bit saving. The present disclosure also describes coding methods for perfectly symmetric meshes that take advantage of both reflection symmetry and mesh compression for both lossy and lossless coding.

In accordance with some embodiments, a method of video coding is provided.

The method includes receiving a mesh with polygons representing a surface of an object; detecting a first symmetric region in the mesh that includes a first symmetry line to divide the first symmetric region into a first partition and a second partition. The method includes recursively determining whether one of the first partition or the second partition includes a second symmetric region until no symmetric region is detected in both the first partition and the second partition. The method includes in response to detecting the second symmetric region within one of the first partition or the second partition: determining a second symmetry line within the second symmetric region to divide the first or the second partition into a third sub-partition and a fourth sub-partition; and compressing information of the third sub-partition, the second symmetry line and the first symmetry line into a bitstream. In some embodiments, the method includes receiving a mesh with polygons representing a surface of an object; determining a first symmetry line of the mesh to divide the mesh into a first portion and a second portion; in accordance with a determination that the first portion satisfies a first set of one or more criteria: the method includes determining a second symmetry line of the first portion to divide the first portion into a third portion and a fourth portion; and compressing information of the third portion of the mesh, the second symmetry line and the first symmetry line into a bitstream.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 10 is a flow diagram illustrating an example method of encoding a mesh in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
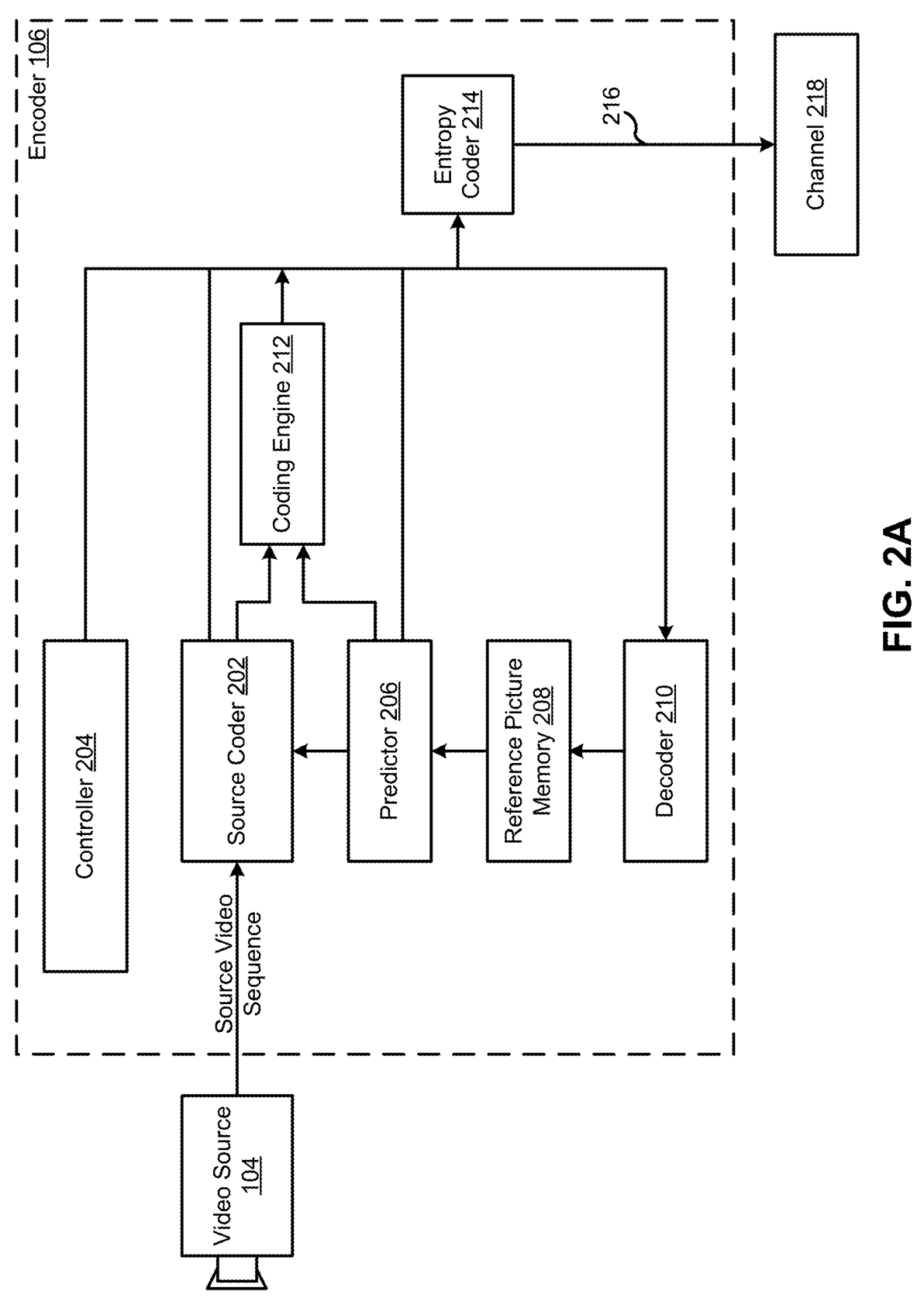
FIG. 2A is a block diagram illustrating example elements of an encoder component in accordance with some embodiments.

The present disclosure describes both lossless and lossy mesh coding technologies based on the symmetry property of mesh contents. More specifically, the disclosed methods and systems relate to reflection symmetry partitioning, prediction, and coding of mesh contents.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color-space (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
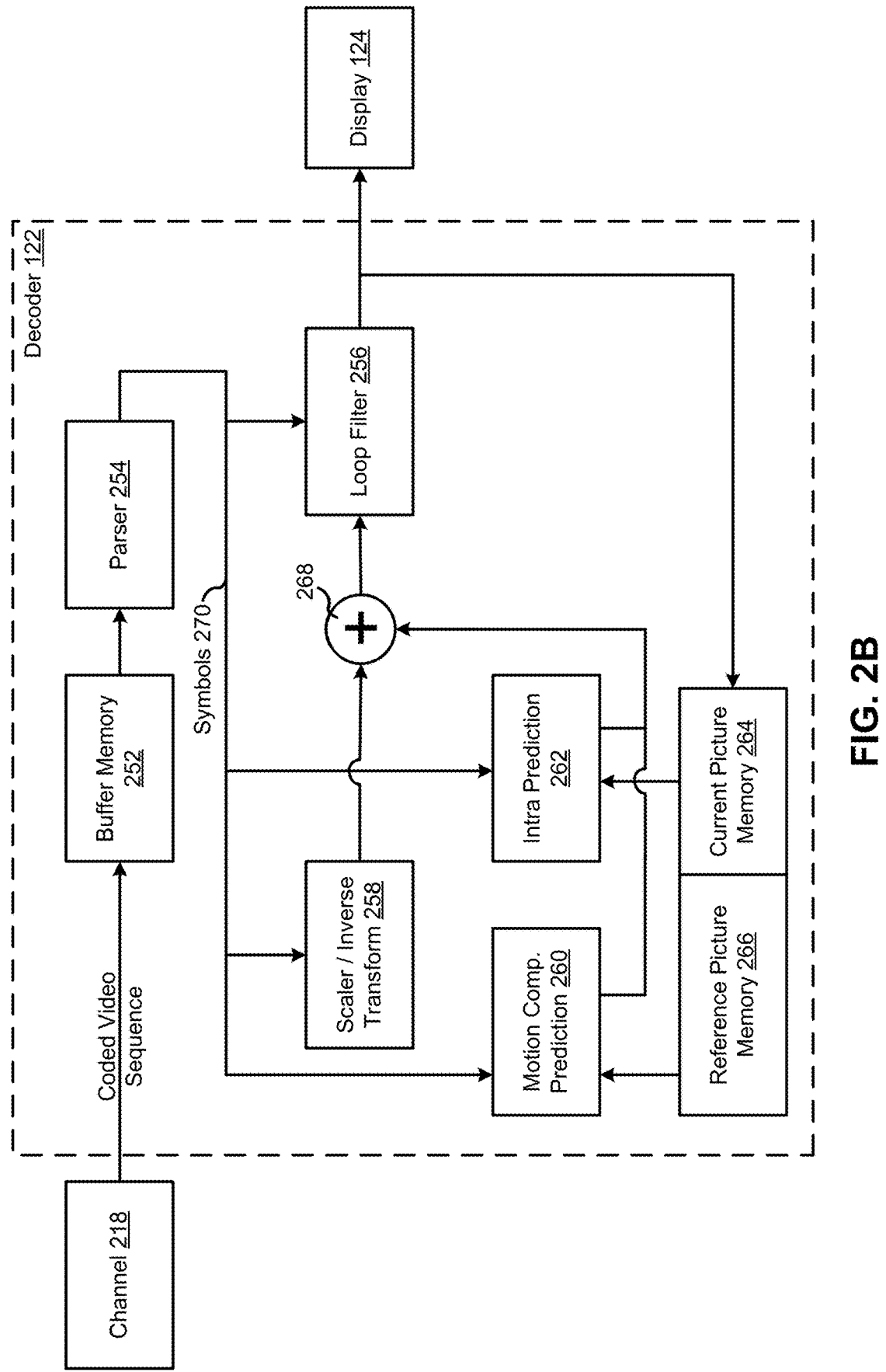
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
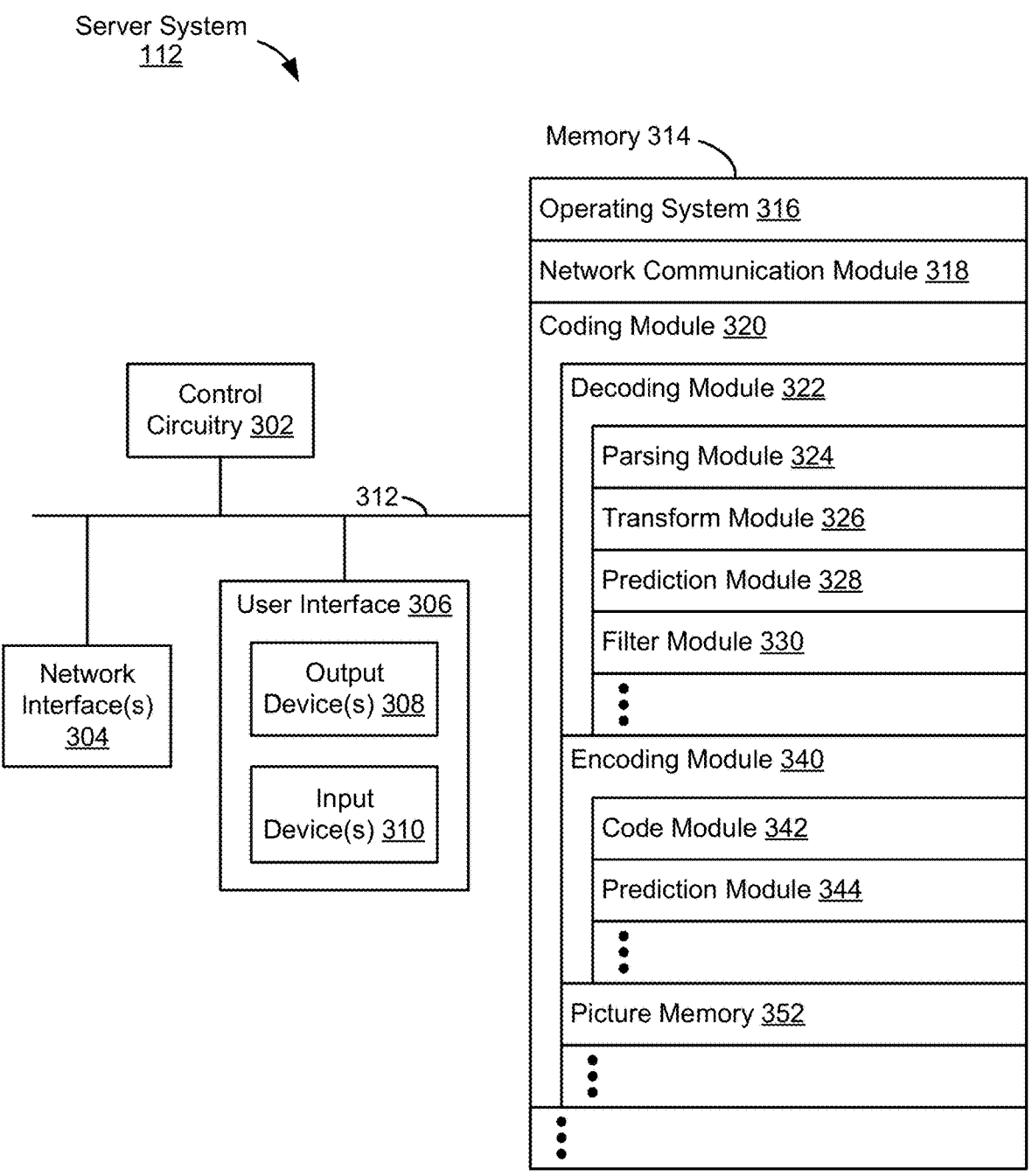
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Approaches

VMesh is an ongoing MPEG standard to compress the static and dynamic meshes. The current VMesh reference software separates an input mesh into a simplified base mesh and displacement vectors, which are coded independently. Symmetry is a property of a geometry object when an operation maps the object to itself. In Euclidean metric, reflection, translation, rotation, and their combinations, are a group of symmetry transform or operations called Euclidean isometry. Reflection symmetry or bilateral symmetry is the most common symmetry that exists in both the biological and non-biological world. In some embodiments, all points and edges of a reflection symmetry mesh has a one-to-one correspondence via a symmetrical plane. Additionally, many artificial objects are designed with reflection symmetry.

In some embodiments, one or more reflection symmetry planes of a mesh is detected by simpler methods using PCA. In some embodiments, one or more reflection symmetry planes of a mesh is detected with more advanced techniques using deep learning.

Reflection symmetry can be utilized to create folding meshes. A folding mesh $\mathcal{M}$ is segmented into mutually exclusive regions:

$$\{R_1, R_2, \ldots, R_n\} st. \bigcup_{i=1}^{n} R_i = \mathcal{M}.$$

A folding tree structure is used to represent symmetry planes, mesh data with symmetry and non-symmetry. While folding meshes have bit saving potential for symmetry meshes, they (1) may not be able to handle vertex misalignment and thus may not be suitable for lossless compression, (2) may ignore the efficiency of other compression tools when reflectional bit saving is less than lossless coding, (3) and may be inefficient in signaling symmetry information.

The methods and systems described herein include operations that can be used separately or combined in any order. The methods and systems described herein are applicable to arbitrary polygon meshes. In some embodiments, the mesh includes a plurality of 3D polygons. The proposed method may be used for both lossy and lossless mesh compression. In this proposal, reflection symmetry is used for demonstration with symmetry structure is a plane in 3D and a line in 2D.

In some embodiments, symmetry meshes are partitioned and encoded recursively. For example, a sub-mesh at i-th iteration $\mathcal{M}_i$ is partitioned into a symmetry $$\mathcal{M}_s^i$$

and an asymmetric $$\mathcal{M}_{as}^i$$

sub-mesh which are mutually exclusive as $$\mathcal{M}_i = \mathcal{M}_i^s \cup \mathcal{M}_i^{as}.$$

Under perfect symmetry condition, there is no asymmetrical part so $$\mathcal{M}_i = \mathcal{M}_i^s.$$

The symmetry sub-mesh $$\mathcal{M}_i^s$$

can be represented by a half mesh $$\mathcal{M}_i^{s1}$$

and a first piece of symmetry information. Under reflectional symmetry, it is a symmetrical plane $p_i$. The other half mesh $$\mathcal{M}_i^{s2}$$

can be derived from $$\mathcal{M}_i^{s1}$$

and $p_i$ by a simple symmetry prediction as $$\mathcal{M}_i^{s2} = SymPred(\mathcal{M}_i^{s1},\ p_i), \tag{1}$$

Under the perfect symmetry condition, the symmetry prediction is accurate without misalignment. Therefore, $$\mathcal{M}_i^{s} = \mathcal{M}_i^{s1} \cup \mathcal{M}_i^{s1}$$

and $$\mathcal{M} = (\mathcal{M}_i^{s1} \cup \mathcal{M}_i^{s2}) \cup \mathcal{M}_i^{as}.$$

This process is done recursively for each new sub-mesh at (i+1)-th iteration $$\mathcal{M}_{i+1} = \mathcal{M}_{s1}^{i}.$$

Symmetry planes and asymmetry sub-meshes are encoded. The overall framework is described in FIG. 4. The remainder part of input mesh after complete partitioning is encoded as well.

A symmetric region detection method is used for mesh partition (P1). In mesh partition, parts of the mesh that are not connected are separated into independent sub-meshes. For example, a mesh depicting a head of a virtual character who is wearing glasses can be separated into a sub-mesh of the glasses, and a sub-mesh of the head of the virtual character. The separated sub-meshes are then partitioned into either one or more symmetric meshes $$(e.g.,\ \mathcal{M}_s^i)$$

or one or more asymmetric meshes $$(e.g.,\ \mathcal{M}_{as}^i).$$

Figure 4:
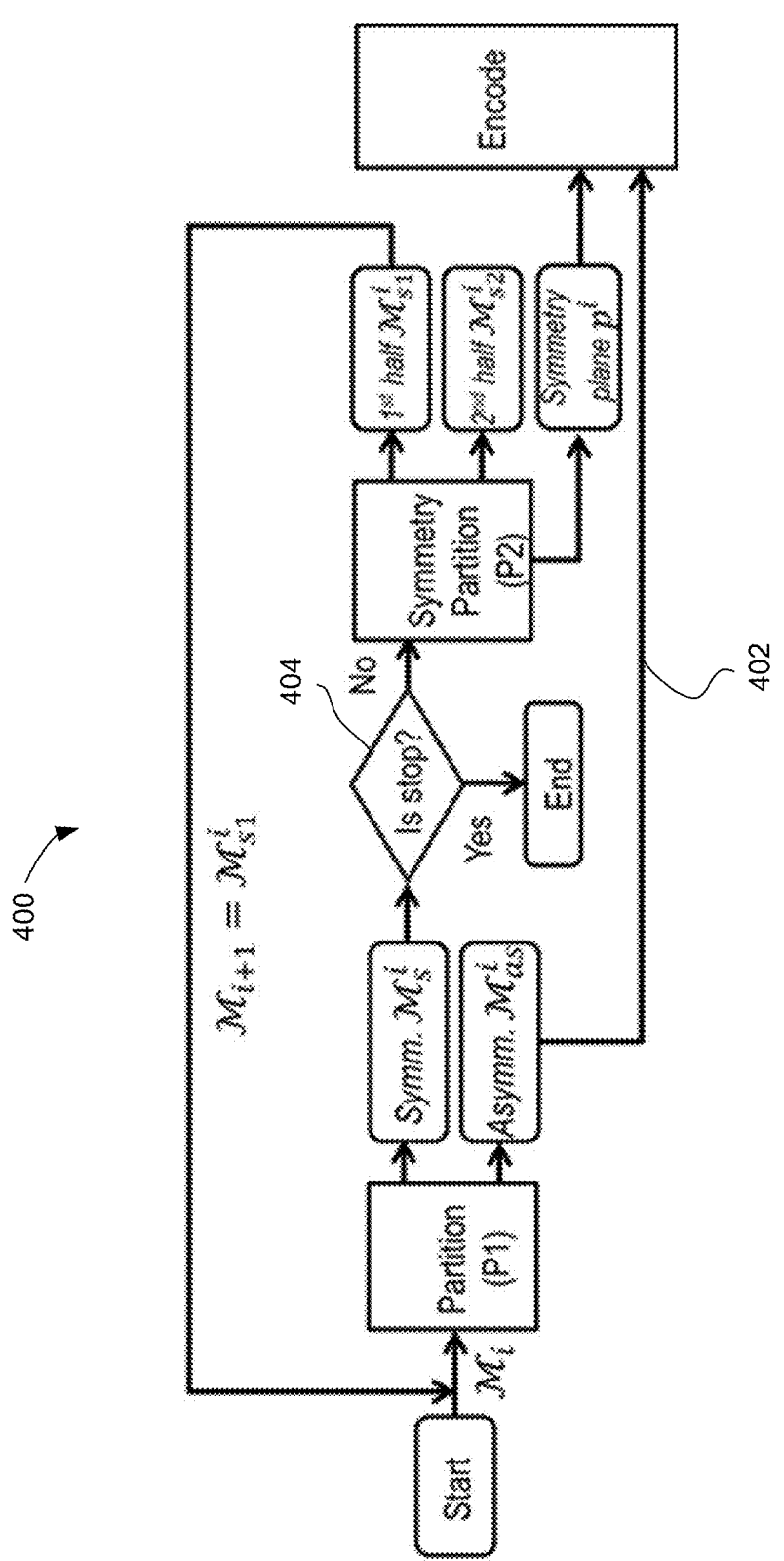
FIG. 4 is a mesh encoder with recursive symmetry partitioning and symmetry predictive coding in accordance with some embodiments.

The one or more asymmetric meshes are encoded, as indicated by arrow 402 in FIG. 4.

At a step 404, the method determines whether to proceed with symmetry partitioning. For example, a cost function may be calculated to determine if a symmetry partition justifies the computational resources for the symmetry partition (e.g., whether the estimated bits to encode $$\mathcal{M}_i^{as},\ \mathcal{M}_i^{s1}$$

and $p_i$ is larger than that for conventional coding (e.g., the estimated bits to encode $\mathcal{M}_i$). Or whether other thresholds are met (e.g., the number symmetry points and/or edges are larger than a given threshold) for symmetry partition to continue. The process is stopped when no significant symmetry part (e.g., the number of symmetry points and edges are larger than a given threshold) remains, or the cost of symmetry-based coding is larger than conventional coding.

For symmetry partition (P2), either half of symmetry mesh can be kept (e.g., for further processing, and/or to be encoded). In some embodiments, the half of the symmetry mesh (e.g., or "symmetry part") with more vertices and faces are selected for further processing, and/or for encoding. Alternatively, the left or upper symmetric part can be selected.

Example Encoding Operations

Figure 5:
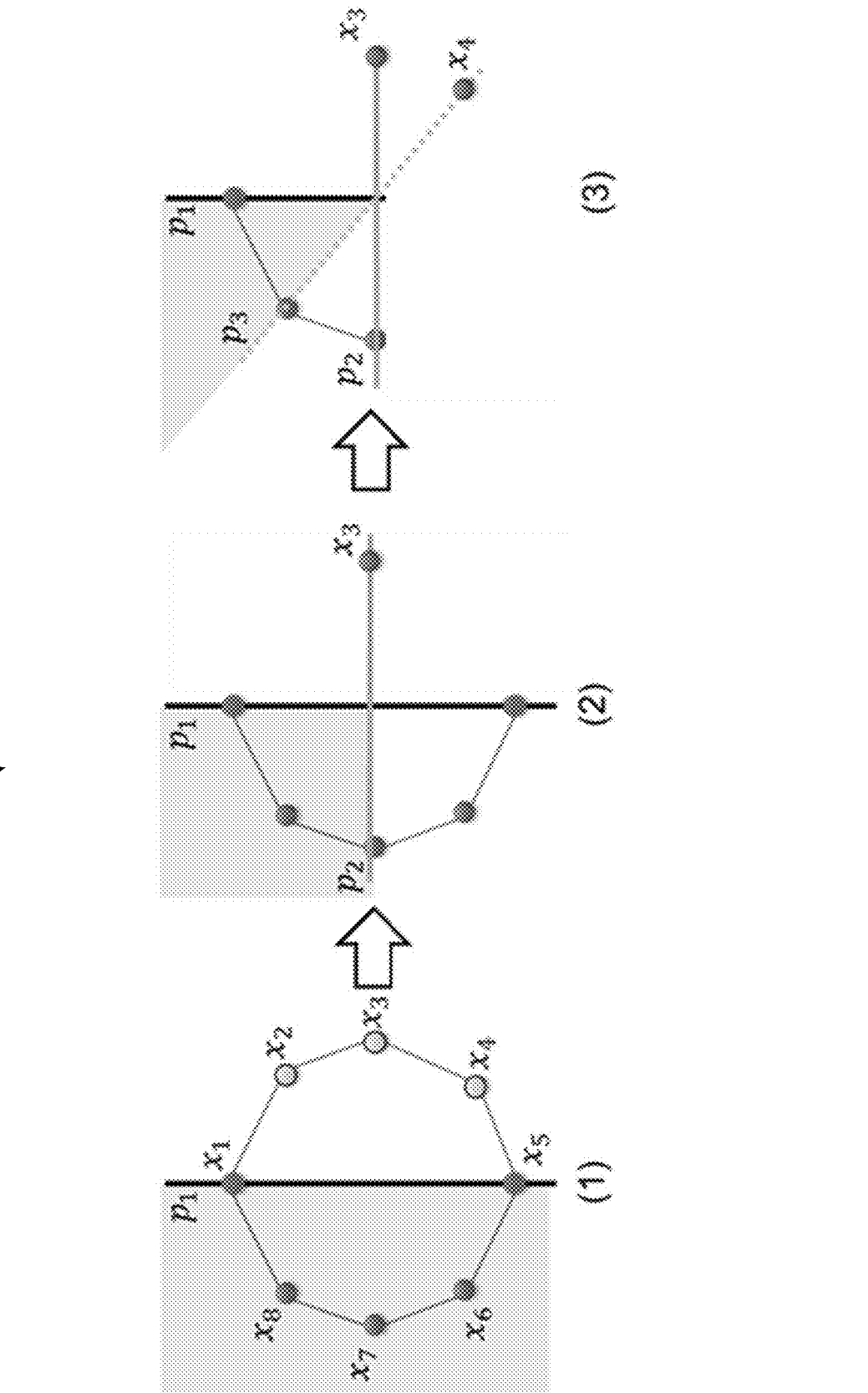
FIG. 5 is an example of a perfect recursive symmetry partitioning in 2D in accordance with some embodiments.

FIG. 5 shows an example of a perfect recursive reflection symmetry partitioning, such as an example encoding process 500. In some embodiments, for each of the potential symmetrical partitions, a flag is signaled in the bitstream to indicate if a respective partition is used. In some embodiments, for each of the potential symmetrical partitions, a flag is not signaled in the bitstream but a determination is made to implicitly derive if a respective partition is used or not. For a respective partition that is used, a description of the partition plane associated with the partition, such as related parameters, are either signaled or derived. As in FIG. 3, the last partitioning at step 3 is unnecessary ($x_1$, $x_7$ are already encoded via symmetry line $p_1$, $p_3$) thus the symmetry partition will stop at step 2.

At step 1 in FIG. 5 shows a two-dimensional (2D) original mesh that includes eight points—$x_1$, $x_2$, $x_3$, $x_4$, $x_5$, $x_6$, $x_7$, and $x_8$. Instead of encoding all eight points, in step 1, only $x_1$ and $x_5$ are encoded to represent symmetry line $p_i$. The symmetry line $p_i$ passes through $x_1$, and $x_5$. In embodiments, in which only the left part of the mesh is kept, step 2 of FIG. 5 shows the left half of the mesh is retained. In step 2, $x_7$ and $x_3$ are encoded to represent symmetry line $p_2$, which passes through the two points $x_7$ and $x_3$. In some embodiments, only the top half of the mesh is retained, as shown in step 3. Step 3 would involve encoding $x_5$ and $x_4$ to represent symmetry $p_3$, but step 3 is not necessary because line $p_3$ maps $x_1$ onto $x_7$, but $x_1$ and $x_7$ have been encoded in step 1 and step 2, respectively. Instead of encoding $x_8$ and $x_4$ to represent symmetry $p_3$, only $x_5$ is encoded. In addition to the encoded vertices/points, the connection between $x_7$ and $x_8$, and the connection between $x_5$ and $x_1$ are encoded. Reflection-based symmetry partitioning is terminated at step 2 for the mesh.

For the example shown in FIG. 5, for an original mesh having eight vertices, three vertices (e.g., $x_2$, $x_4$, and $x_6$) can be derived without encoding (e.g., only five vertices $x_1$, $x_3$, $x_5$, $x_7$, and $x_8$ are encoded). The eight vertices mesh in FIG. 5 also includes eight connections, and six out of the eight can be derived (e.g., only the connection between $x_7$ and xa, and the connection between $x_5$ and $x_1$ are encoded).

Example Decoding Operations

In some embodiments, reflection symmetry predictive coding is used to decode a perfect reflection symmetry mesh. In a perfect reflection symmetry mesh, all vertices and edges have their correspondences with respect to respective reflection planes. In some embodiments, based on the already one or more decoded coordinates and one or more decoded connections, remaining coordinates and connections are predicted based on information about a distance of a vertex from a symmetry line or symmetry plane to decode a vertex that is the same distance away from the symmetry line or plane, along a normal direction of the symmetry line or plane.

Figure 6:
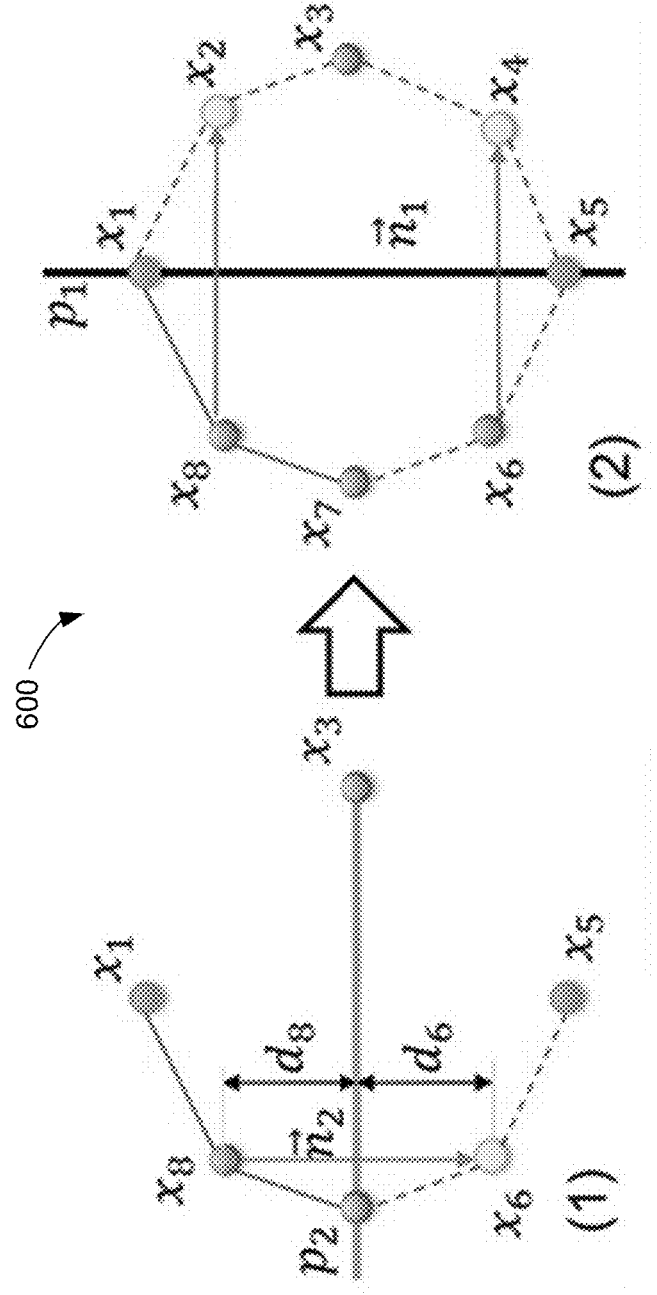
FIG. 6 is an example of a perfect reflection symmetry prediction in accordance with some embodiments.

Using the encoded information from the example described with respect to FIG. 5 (e.g., $x_1$, $x_3$, $x_5$, $x_7$, $x_8$, the connection between $x_7$ and $x_8$, and the connection between $x_8$ and $x_1$ are encoded), the original mesh can be decoded as shown in FIG. 6.

FIG. 6 shows an example decoding process 600. In Step 1 of the decoding process, symmetry line $p_2$ is used to derive or predict $x_6$ by locating $x_6$ along a normal vector $\vec{n}_2$ of the symmetry line $p_2$ from $x_8$, where $x_6$ is at a same distance away from symmetry line $p_2$ as $x_5$ is away from symmetry line $p_2$. That is, distance $d_8$ is the shortest distance between $x_8$ and symmetry line $p_2$, and $d_6$ is the shortest distance between predicted/derived $x_6$ and symmetry line $p_2$ such that $d_6$ and $d_8$ are the same (e.g., $d_8=d_6$). The connection between $x_7$ and $x_8$, is similarly reflected to predict the connection between $x_7$ and $x_6$ and the connection between $x_5$ and $x_1$ is reflected to predict the connection between $x_6$ and $x_5$.

In Step 2, after $x_6$ is obtained, symmetry line $p_1$ is used to derive or predict $x_4$ by locating $x_4$ along a normal vector $\vec{n}_1$ of the symmetry line $p_1$, at a same distance from symmetry line $p_i$ as $x_6$ is from the symmetry line $p_1$. Similarly, symmetry line $p_i$ is used to derive or predict $x_2$ by locating $x_2$ along a normal vector $\vec{n}_1$ of the symmetry line $p_i$, at a same distance from symmetry line $p_i$ as $x_8$ is from the symmetry line $p_i$. The connection between $x_7$ and $x_8$, is similarly reflected to predict the connection between $x_2$ and $x_3$ and the connection between $x_5$ and $x_1$ is reflected to predict the connection between $x_2$ and $x_1$. The connection between $x_7$ and $x_6$, is similarly reflected to predict the connection between $x_3$ and $x_4$ and the connection between $x_6$ and $x_5$ is reflected to predict the connection between $x_4$ and $x_5$.

Examples of Encoding and Decoding Symmetrical Planes

Figure 7:
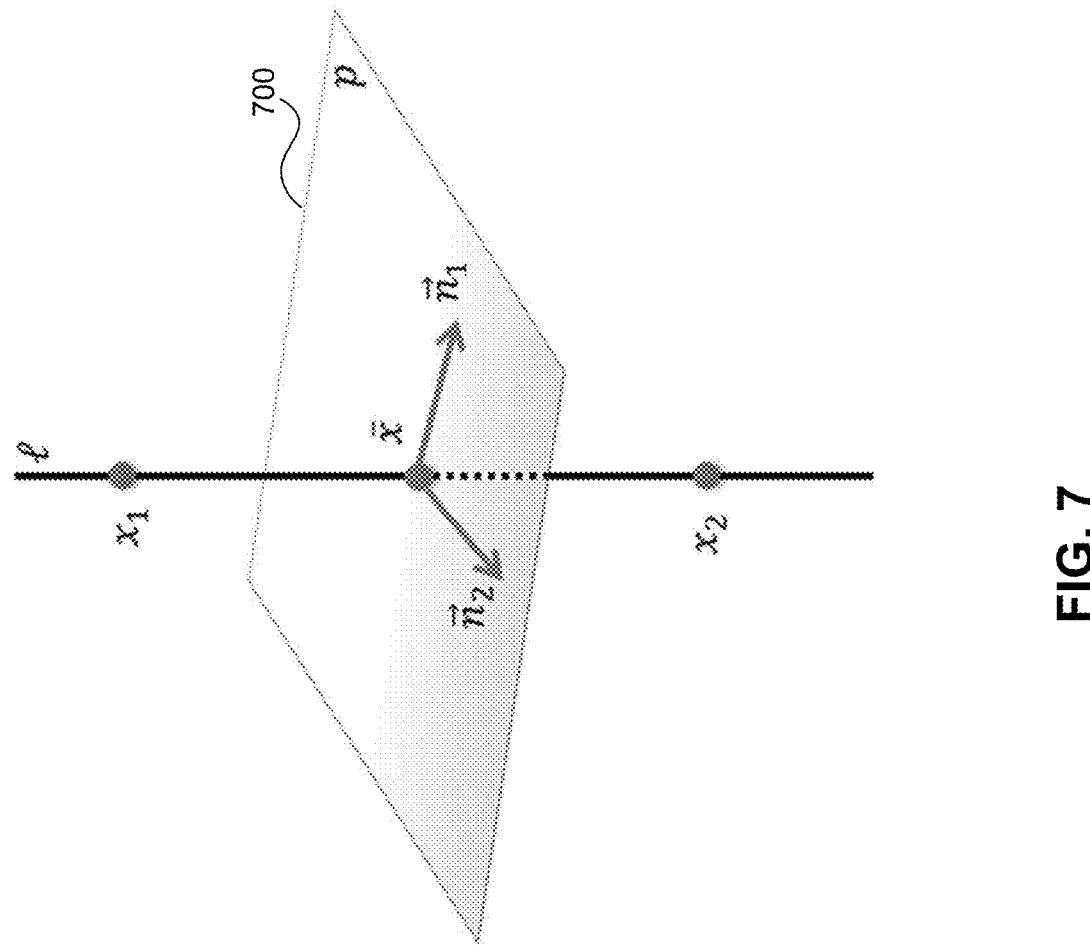
FIG. 7 is a plane representation by a symmetry pair in accordance with some embodiments.

In some embodiments, instead of using three 3d points to represent the symmetric plane p, only two 3D points of a symmetry pair $(x_1, x_2)$ is used as shown in FIG. 7, where $x_2$ is the symmetry of $x_1$ over symmetric plane p. At the decoder, p can be derived as the unique 3D plane 700 that passes through the middle point $$\bar{x} = \frac{1}{2}(x_1 + x_2)$$

and is perpendicular to the line $\ell$ that connect two points $x_1$, $x_2$. The 3D plane 700 is equivalent to a plane pass through point z with a normal vector defined by $\ell$. $x_1$ can be encoded in mesh data or plane signaling. In such scenarios, only a single 3D point (x,y,z) has to signaled.

In some embodiments, a symmetrical plane is encoded by modelling the symmetry plane using the equation ax+by+cz+d=0, in which the values of (a,b,c,d) are signaled.

Figure 8:
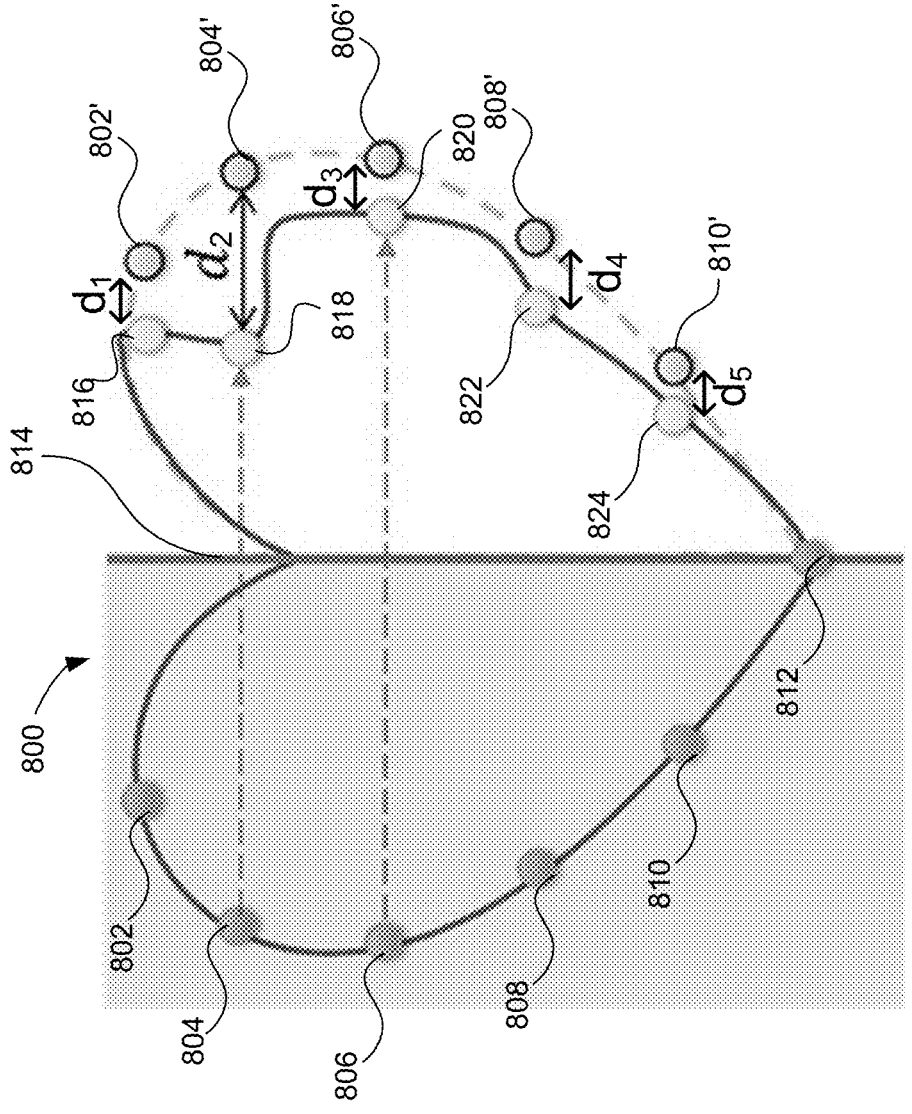
FIG. 8 is an example of symmetry prediction for an almost symmetric mesh in accordance with some embodiments.

In some embodiments, an almost symmetric mesh is partitioned and encoded recursively. An almost symmetric mesh is one that includes one-to-one vertex correspondence via a symmetry plane and also one or more additional displacements from respective vertex predicted via perfect symmetric reflection as illustrated in FIG. 8.

In mesh 800, symmetry line 814 passes through vertex 812. A reflection of vertex 802 about symmetry line 814 would yield 802' but mesh 800 includes vertex 816, which is displaced by a distance $d_1$ from point 802'. Mesh 800 also includes vertex 818, which is displaced by a distance $d_2$ from point 804', vertex 820, which is displaced by a distance $d_3$ from point 806', vertex 822, which is displaced by a distance $d_4$ from point 808', and vertex 824, which is displaced by a distance $d_5$ from point 810'. In mesh 800, all displacements $d_1$, $d_2$, $d_3$, $d_4$, and $d_5$ are closer to the symmetry line 814 than the respective points obtained by reflecting a vertex about the symmetry line 814. In general, the displacement may be to the left or to the right of the reflected point. In addition, the displacement may extend along more than one direction (e.g., up/down displacement in addition to left/right displacement).

Figure 9:
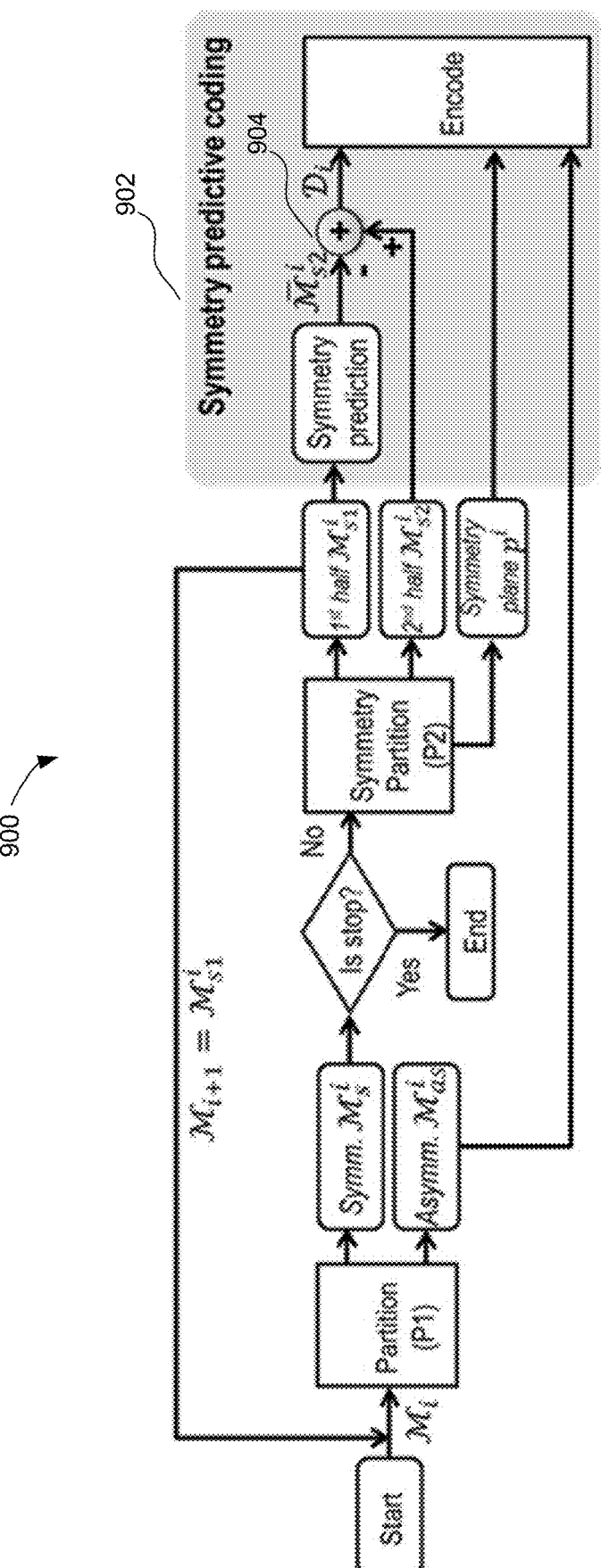
FIG. 9 is an example of mesh encoding for almost symmetric meshes with symmetry predictive coding in accordance with some embodiments.

FIG. 9 illustrates an example encoding framework for almost symmetric meshes. FIG. 9 shows an encoding framework 900 that differs from encoding framework 400 by the inclusion of symmetry predictive coding portion 902. The symmetry predictive coding portion 902 includes circuitry for implementing step 904, which compares the two halves of the mesh split by symmetry prediction (e.g., $$\mathcal{M}_i^{s2} \text{ and } \mathcal{M}_i^{s1})$$

as being symmetric. The other half mesh $\mathcal{M}_i^{s2}$ (e.g., the discarded portion, the portion not encoded) can be derived from $\mathcal{M}_i^{s1}$ (e.g., the encoded portion) and $p_i$ by a simple reflectional prediction as $$\mathcal{M}_i^{s2} = SymPred(\mathcal{M}_i^{s1}, \ p_i) + D_i, \qquad (2)$$

with $\mathcal{D}$ represents a displacement vector. Eq. (1) is a special case of Eq. (2) when all displacements are zeros. For almost symmetric meshes, the encoder encodes asymmetric meshes, symmetry planes, and the displacement vector.

The output of the comparison at step 904 yields the displacement vector $\mathcal{D}_i$ of the differences between the actual position of respective vertex and the predicted position of respective vertex based on symmetry. Information about the displacement vector $\mathcal{D}_i$ is compressed into the bitstream.

FIG. 10 is a flow diagram illustrating a method 1000 of coding video in accordance with some embodiments. The method 1000 may be performed at a computing system (e.g., the server system 112, the source device 102, or the electronic device 120) having control circuitry and memory storing instructions for execution by the control circuitry. In some embodiments, the method 1000 is performed by executing instructions stored in the memory (e.g., the memory 314) of the computing system.

The system receives (1002) a mesh with polygons representing a surface of an object. The system detects (1004) a first symmetric region in the mesh that includes a first symmetry line to divide the first symmetric region into a first partition and a second partition. The system, recursively determines (1006) whether one of the first partition or the second partition includes a second symmetric region until no symmetric region is detected in both the first partition and the second partition. In response to detecting the second symmetric region within one of the first partition or the second partition: the system determines (1008) a second symmetry line within the second symmetric region to divide the first or the second partition into a third sub-partition and a fourth sub-partition; and the system compresses (1010) information of the third sub-partition, the second symmetry line and the first symmetry line into a bitstream.

In some embodiments, the first line of symmetry is a reflectional plane of symmetry. In some embodiments, the system compresses a first set of information about the third sub-partition into the bitstream. In some embodiments, prior to determining the symmetry plane of the mesh, the system partitions the mesh into a first symmetric portion and a second asymmetric portion, and where determining the symmetry plane of the mesh includes determining the symmetry plane of the first symmetric portion, and compressing information of the second asymmetric portion into the bitstream.

In some embodiments, partitioning the mesh into the first symmetric portion and the second asymmetric portion includes: in accordance with a determination that the mesh includes one or more non-connected mesh components, separating the mesh into respective non-connected mesh components. In some embodiments, compressing the information about the first symmetry line into the bitstream includes encoding a set of vertices of the first partition. In some embodiments, the system reconstructs the mesh using the first symmetry line and information about a normal direction of the first symmetry line, a distance of an encoded vertex from the first symmetry line.

In some embodiments, determining the first symmetry line includes determining a first symmetry plane containing the first symmetry line, and compressing the information about the first symmetry line into the bitstream includes encoding the first symmetry plane. In some embodiments, the first symmetry plane is encoded using a symmetry pair of vertices including a first vertex and a second vertex such that a reflection of the first vertex about the first symmetry plane provides the second vertex. In some embodiments, the first vertex of the symmetry pair of vertices is encoded in mesh data or is signaled with the first symmetry plane. In some embodiments, the first symmetry plane is modelled using a linear equation having four parameters that are signaled.

In some embodiments, a reflected vertex is a vertex of the first partition that is reflected about the first symmetry line, and the reflected vertex and a corresponding vertex from the second portion has a first displacement, and the system compresses information about the first displacement into the bitstream. In some embodiments, the system provides a displacement vector that includes respective displacements between a set of vertices of the first partition and a corresponding set of vertices of the second portion, and the system compresses information about the displacement vector into the bitstream. In some embodiments, the first partition and the second partition include an almost symmetric mesh.

Although FIG. 10 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 1000) of video coding. In some embodiments, the method is performed at a computing system (e.g., the server system 112) having memory and control circuitry. In some embodiments, the method is performed at a coding module (e.g., the coding module 320). In some embodiments, the method is performed at an entropy coder (e.g., the entropy coder 214). The method includes: (i) receiving a mesh with polygons representing a surface of an object; (ii) detecting a first symmetric region in the mesh that includes a first symmetry line to divide the first symmetric region into a first partition and a second partition. The method includes (iii) recursively determining whether one of the first partition or the second partition includes a second symmetric region until no symmetric region is detected in both the first partition and the second partition. The method includes in response to detecting the second symmetric region within one of the first partition or the second partition: (iv) determining a second symmetry line within the second symmetric region to divide the first or the second partition into a third sub-partition and a fourth sub-partition; and (v) compressing information of the third sub-partition, the second symmetry line and the first symmetry line into a bitstream. In some embodiments, the method includes (i) receiving a mesh (e.g., a 3D mesh, a 3D mesh having a number of 2D mesh segments) with polygons (e.g., triangular mesh) representing a surface of an object; (ii) determining a first symmetry line (e.g., the first symmetry line is a first symmetry plane) of the mesh to divide the mesh into a first partition and a second partition (e.g., the first partition is identical to the second partition when there is perfect symmetry, the first partition differs from the second partition by an amount less than a threshold amount when they are almost symmetric); (iii) in accordance with a determination that the first partition satisfies a first set of one or more criteria (e.g., the first set of one or more criteria includes a cost function, the cost function to further divide the sub-mesh remains lower than a threshold): determining a second symmetry line (e.g., the second symmetry line is a line in a second symmetry plane) of the first partition to divide the first partition into a third portion and a fourth portion; and (iv) compressing information of the third portion of the mesh, the second symmetry line and the first symmetry line into a bitstream.

(A2) In some embodiments of A1, the method includes compressing a first set of information (e.g., the first set of information includes connectivity information about the encoded points) about the third sub-partition into the bitstream.

(A3) In some embodiments of A1 or A2, the method includes: prior to detecting the first symmetric region, partitioning the mesh into a first symmetric portion and a second asymmetric portion, wherein detecting the first symmetric region in the mesh comprises determining the first symmetry line, and compressing information of the second asymmetric portion into the bitstream.

(A4) In some embodiments of A3, where partitioning the mesh into the first symmetric portion and the second asymmetric portion includes: in accordance with a determination that the mesh includes one or more non-connected mesh components, separating the mesh into respective non-connected mesh components.

(A5) In some embodiments of any of A1-A4, where compressing the information about the first symmetry line into the bitstream includes encoding a set of vertices of the first partition (e.g., the set of vertices represents the symmetry line or symmetry plane).

(A6) In some embodiments of any of A1-A5, further includes reconstructing the mesh (e.g., determining the positions of one or more un-encoded vertices) using the first symmetry line and information about a normal direction of the first symmetry line, a distance of an encoded vertex from the first symmetry line (e.g., the directionality of the decoding is reversed of that used for the encoding, vertices are decoded using the second symmetry line before being decoded with the first symmetry line).

(A7) In some embodiments of any of A1-A6, determining the first symmetry line includes determining a first symmetry plane containing the first symmetry line, and compressing the information about the first symmetry line into the bitstream includes encoding the first symmetry plane.

(A8) In some embodiments of A7, where the first symmetry plane is encoded using a symmetry pair of vertices including a first vertex and a second vertex such that a reflection of the first vertex about the first symmetry plane provides the second vertex (e.g., the first symmetry plane bisects a line connecting the first vertex to the second vertex).

(A9) In some embodiments of A8, where the first vertex of the symmetry pair of vertices is encoded in mesh data or is signaled with the first symmetry plane.

(A10) In some embodiments of A7, where the first symmetry plane is modelled using a linear equation having four parameters that are signaled.

(A11) In some embodiments of any of A1-A10, where a reflected vertex is a vertex of the first partition that is reflected about the first symmetry line, and the reflected vertex and a corresponding vertex from the second portion (e.g., the corresponding vertex is a mirror reflection of the vertex of the first partition about the first symmetry line) has a first displacement, and the method includes compressing information about the first displacement into the bitstream.

(A12) In some embodiments of A11, the method includes providing a displacement vector that includes respective displacements between a set of vertices of the first partition and a corresponding set of vertices of the second portion, and the method includes compressing information about the displacement vector into the bitstream.

(A13) In some embodiments of A11, where the first partition and the second portion include an almost symmetric mesh (e.g., the almost symmetric mesh includes one-to-one vertex correspondence via a symmetry plane and respective displacements).

(A14) In some embodiments of any of A1-A13, where the first line of symmetry is a reflectional plane of symmetry.

The methods described herein may be used separately or combined in any order. Each of the methods may be implemented by processing circuitry (e.g., one or more processors or one or more integrated circuits). In some embodiments, the processing circuitry executes a program that is stored in a non-transitory computer-readable medium.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A14 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A14 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for encoding a mesh performed by a computing system having memory and one or more processors, the method comprising:

receiving a mesh with polygons representing a surface of an object;

detecting a first symmetric region in the mesh comprising a first symmetry line to divide the first symmetric region into a first partition and a second partition;

recursively determining whether one of the first partition or the second partition includes a second symmetric region until no symmetric region is detected in both the first partition and the second partition;

in response to detecting the second symmetric region within one of the first partition or the second partition:

determining a second symmetry line within the second symmetric region to divide the first or the second partition into a third sub-partition and a fourth sub-partition; and compressing information of the third sub-partition, the second symmetry line and the first symmetry line into a bitstream, wherein a reflected vertex is a vertex of the first partition that is reflected about the first symmetry line, and the reflected vertex and a corresponding vertex from the second partition has a first displacement, and the method includes compressing information about the first displacement into the bitstream.

2. The method of claim 1, further comprising:

compressing a first set of information about the third sub-partition into the bitstream.

3. The method of claim 1, further comprising:

prior to detecting the first symmetric region, partitioning the mesh into a first symmetric portion and a second asymmetric portion, wherein detecting the first symmetric region in the mesh comprises determining the first symmetry line, and compressing information of the second asymmetric portion into the bitstream.

4. The method of claim 3, wherein partitioning the mesh into the first symmetric portion and the second asymmetric portion further comprises:

in accordance with a determination that the mesh includes one or more non-connected mesh components, separating the mesh into respective non-connected mesh components.

5. The method of claim 1, wherein compressing the information about the first symmetry line into the bitstream comprises encoding a set of vertices of the first partition.

6. The method of claim 1, further comprising:

reconstructing the mesh using the first symmetry line and information about a normal direction of the first symmetry line, a distance of an encoded vertex from the first symmetry line.

7. The method of claim 1, wherein determining the first symmetry line comprises determining a first symmetry plane containing the first symmetry line, and wherein compressing the information about the first symmetry line into the bitstream comprises encoding the first symmetry plane.

8. The method of claim 7, wherein the first symmetry plane is encoded using a symmetry pair of vertices comprising a first vertex and a second vertex such that a reflection of the first vertex about the first symmetry plane provides the second vertex.

9. The method of claim 8, wherein the first vertex of the symmetry pair of vertices is encoded in mesh data or is signaled with the first symmetry plane.

10. The method of claim 7, wherein the first symmetry plane is modelled using a linear equation having four parameters that are signaled.

11. The method of claim 1, further comprising: providing a displacement vector comprising respective displacements between a set of vertices of the first partition and a corresponding set of vertices of the second partition, and the method includes compressing information about the displacement vector into the bitstream.

12. The method of claim 1, wherein the first partition and the second partition comprise an almost symmetric mesh.

13. The method of claim 1, wherein the first line of symmetry is a reflectional plane of symmetry.

14. A computing system, comprising:
control circuitry;
memory; and
one or more sets of instructions stored in the memory and configured for execution by the control circuitry, the one or more sets of instructions comprising instructions for:
receiving a mesh with polygons representing a surface of an object;
detecting a first symmetric region in the mesh comprising a first symmetry line to divide the first symmetric region into a first partition and a second partition;
recursively determining whether one of the first partition or the second partition includes a second symmetric region until no symmetric region is detected in both the first partition and the second partition;
in response to detecting the second symmetric region within one of the first partition or the second partition: determining a second symmetry line within the second symmetry region to divide the first or the second partition into a third sub-partition and a fourth sub-partition; and
compressing information of the third sub-partition, the second symmetry line and the first symmetry line into a bitstream, wherein a reflected vertex is a vertex of the first partition that is reflected about the first symmetry line, and the reflected vertex and a corresponding vertex from the second partition has a first displacement, and the instructions includes instructions for compressing information about the first displacement into the bitstream.

15. The computing system of claim 14, wherein the one or more sets of instructions further comprises instructions for compressing a first set of information about the third sub-partition into the bitstream.

16. The computing system of claim 14, wherein the one or more sets of instructions further comprise instructions for, prior to determining a symmetry plane of the mesh, partitioning the mesh into a first symmetric portion and a second asymmetric portion, wherein determining the symmetry plane of the mesh comprises determining a symmetry plane of the first symmetric portion, and compressing information of the second asymmetric portion into the bitstream.

17. A non-transitory computer-readable storage medium storing one or more sets of instructions configured for execution by a computing device having control circuitry and memory, the one or more sets of instructions comprising instructions for:
receiving a mesh with polygons representing a surface of an object;
detecting a first symmetric region in the mesh comprising a first symmetry line to divide the first symmetric region into a first partition and a second partition;
recursively determining whether one of the first partition or the second partition includes a second symmetric region until no symmetric region is detected in both the first partition and the second partition;
in response to detecting the second symmetric region within one of the first partition or the second partition: determining a second symmetry line within the second symmetry region to divide the first or the second partition into a third sub-partition and a fourth sub-partition; and
compressing information of the third sub-partition, the second symmetry line and the first symmetry line into a bitstream, wherein a reflected vertex is a vertex of the first partition that is reflected about the first symmetry line, and the reflected vertex and a corresponding vertex from the second partition has a first displacement, and the instructions includes instructions for compressing information about the first displacement into the bitstream.

18. The non-transitory computer-readable storage medium of claim 17, wherein the one or more sets of instructions further comprises instructions for compressing a first set of information about the third sub-partition into the bitstream.

19. The non-transitory computer-readable storage medium of claim 17, wherein the one or more sets of instructions further comprise instructions for, prior to determining a symmetry plane of the mesh, partitioning the mesh into a first symmetric portion and a second asymmetric portion, wherein determining the symmetry plane of the mesh comprises determining a symmetry plane of the first symmetric portion, and compressing information of the second asymmetric portion into the bitstream.

\*  \*  \*  \*  \*